United States Patent [19]
Capgras

[11] 3,736,000
[45] May 29, 1973

[54] AUTOMOBILE SUSPENSION

[75] Inventor: Rene Capgras, Paris, France

[73] Assignee: Industrial Development Company Establishments, Vaduz, Liechtenstein

[22] Filed: Feb. 17, 1971

[21] Appl. No.: 116,195

[30] Foreign Application Priority Data

Feb. 24, 1970 France..................................7006442

[52] U.S. Cl..............................280/124 F, 267/65 D
[51] Int. Cl............................................B60g 17/04
[58] Field of Search................267/64 R, 65 R, 65 D; 280/124 H

[56] References Cited

UNITED STATES PATENTS

| | | | |
|---|---|---|---|
| 3,328,019 | 6/1967 | Wilson | 267/64 R |
| 3,090,611 | 5/1963 | Schultze | 267/64 R |
| 2,970,614 | 2/1961 | Christensen | 267/64 D |

*Primary Examiner*—Philip Goodman
*Attorney*—Karl F. Ross

[57] ABSTRACT

Two parallel road wheels of an automotive vehicle are loaded by the pistons of respective jacks each having a cylinder with a main chamber connected to a main pressure accumulator, an upper ancillary chamber and a lower ancillary chamber, the ancillary chambers of the two jacks being cross-connected by pipes provided with respective ancillary pressure accumulators. Oil under pressure is supplied to the main chambers under the control of a distributor responsive to changes in static load and, independently thereof, is delivered to the ancillary chambers by way of a slide valve cutting off the supply upon a tilting of the vehicle giving rise to a substantial pressure differential between the two cross-connecting pipes. The slide valve is in series with a pressure selector manually settable to different oil pressures corresponding to different levels of the vehicular center of gravity.

8 Claims, 11 Drawing Figures

Patented May 29, 1973 3,736,000

INVENTOR
René CAPGRAS

BY Karl J. Ross

ATTORNEY

Patented May 29, 1973

INVENTOR
René CAPGRAS

BY Karl J. Ross

ATTORNEY

AUTOMOBILE SUSPENSION

The present invention relates to a hydro-pneumatic suspension system intended for fitting mainly to motor vehicles. It more particularly concerns a device allowing the correction of roll to be carried out with a variable flexibility.

In my copending U. S. application Ser. No. 808,399 filed Mar. 19, 1969, now U.S. Pat. No. 3,606,374, a hydro-pneumatic suspension in which a pair of crossed pipes allows the effective correction of roll, particularly on bends, by the action of a triple piston of each suspension device. The magnitude of the oil pressure present in each of the two crossed pipes is determined by the action of a hydraulic accumulator which has a cushion of gas, fitted to each of these crossed pipes, the oil being supplied by a single distributor connected to a source of constant pressure. Such a known hydro-pneumatic suspension arrangement may ensure the correction of roll in an effective manner in relation to the amount of the total rolling weight of the vehicle, but its operation remains completely unaffected by the way in which the load is distributed on the vehicle. For example, for a given total rolling weight, if the vehicle carries a very bulky load of straw or empty packing cases, its center of gravity is situated very high above the road and there results from this, in a curve, a tendency to an extremely pronounced sway which would necessitate a very stiff setting of the roll-corrector device. If, on the other hand, the same vehicle is loaded to have the same total rolling weight with steel bars or with materials of very high density, the overall center of gravity remains low and an effective correction of roll in a curve combined with a satisfactory degree of comfort on the straight would necessitate an adjustment of the correction device to a different flexibility. It is evident that such a result cannot be obtained with this type of suspension.

The present invention has the aim of avoiding these disadvantages by the provision of a roll-correction device whose response characteristic can be varied in relation to the height of the center of gravity of the load above the wheels, independently of the actual magnitude of this load, that is to say, independently of the operation of the main vertical suspension of the vehicle.

According to this invention a hydro-pneumatic suspension system for a motor vehicle comprises two piston-and-cylinder devices or jacks adapted to be connected between the vehicle chassis and respective road wheels at opposite sides of the vehicle, each device having three fluid chambers in its cylinder, i.e. a main chamber for the vertical suspension, connected to a main pressure accumulator and two vertically superposed ancillary chambers acting differentially upon the associated piston; the upper ancillary chamber of one cylinder is connected to the lower ancillary chamber of the other cylinder, and vice versa, by two crossed pipes or conduits each communicating with an ancillary hydraulic accumulator provided with a gas cushion. The hydraulic fluid is fed to the main chambers, on the one hand, and to the crossed pipes, on the other hand, by separate channels, the latter feed channel including a switching valve arranged to compensate for the roll of the vehicle and a pressure regulator upstream of that valve adjustable to preset the pressure in the crossed pipes and their associated chambers. The arrangement and operation of the two hydraulic jacks may be similar to that described in my aforementioned U.S. Pat. No. 3,606,374.

The regulator according to my invention may comprise a manual controller having several positions, each of which corresponds to a given magnitude of feed pressure. After having loaded his vehicle, the driver manually selects the stiffness which he requires for roll correction.

On the other hand, the control of the regulator may also be carried out automatically in relation to the vehicle's reactions, mainly in curves. The detection of these reactions and their transformation into control impulses sent to the regulating distributor may be carried out by any known means (e.g. electronic or mechanical).

According to a more particular feature of the invention, the regulator is constituted by a distributor in the form of a slide valve whose housing has confronting inlet and outlet ports for the hydraulic fluid normally aligned with a constructed portion of its slides forming a connecting passage therebetween, this slider being subjected at its ends to the action of the pressures present in the crossed pipes, and being urged by opposing springs into a central position which it occupies when these two pressures are of equal value. Thus, as soon as the vehicle tends to tilt on a bend, the pressure predominating in one of the two crossed pipes causes the slider to move, immediately interrupting the oil feed and isolating the two pipes.

The invention will be better understood from the following description of a representative embodiment thereof, as applied to a hydro-pneumatic suspension system for a motor vehicle, given by way of example with reference to the accompanying drawing, in which:

FIGS. 1 to 6 are front views showing schematically the variations in the height of the center of gravity of a vehicle above the ground as a function of the nature of the load carried, which will give rise to different reactions when the vehicle is negotiating a curve, FIG. 7 is a hydraulic diagram showing the principle of a suspension system according to the invention with three degrees of resistance against rolling;

FIG. 11 shows details of a make-and-break switch designed as a slide valve.

Figure 1:
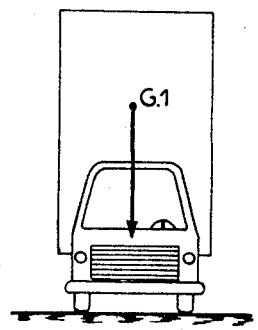

There are shown in the drawing various parts of a motor vehicle, e.g. a truck, whose suspension and roll-correction system operate on the principle described in my above-mentioned U.S. Pat. No. 3,606,374. This operating principle need therefore not be described in detail here, the following description being confined to the roll-correction mechanism.

Figure 7:
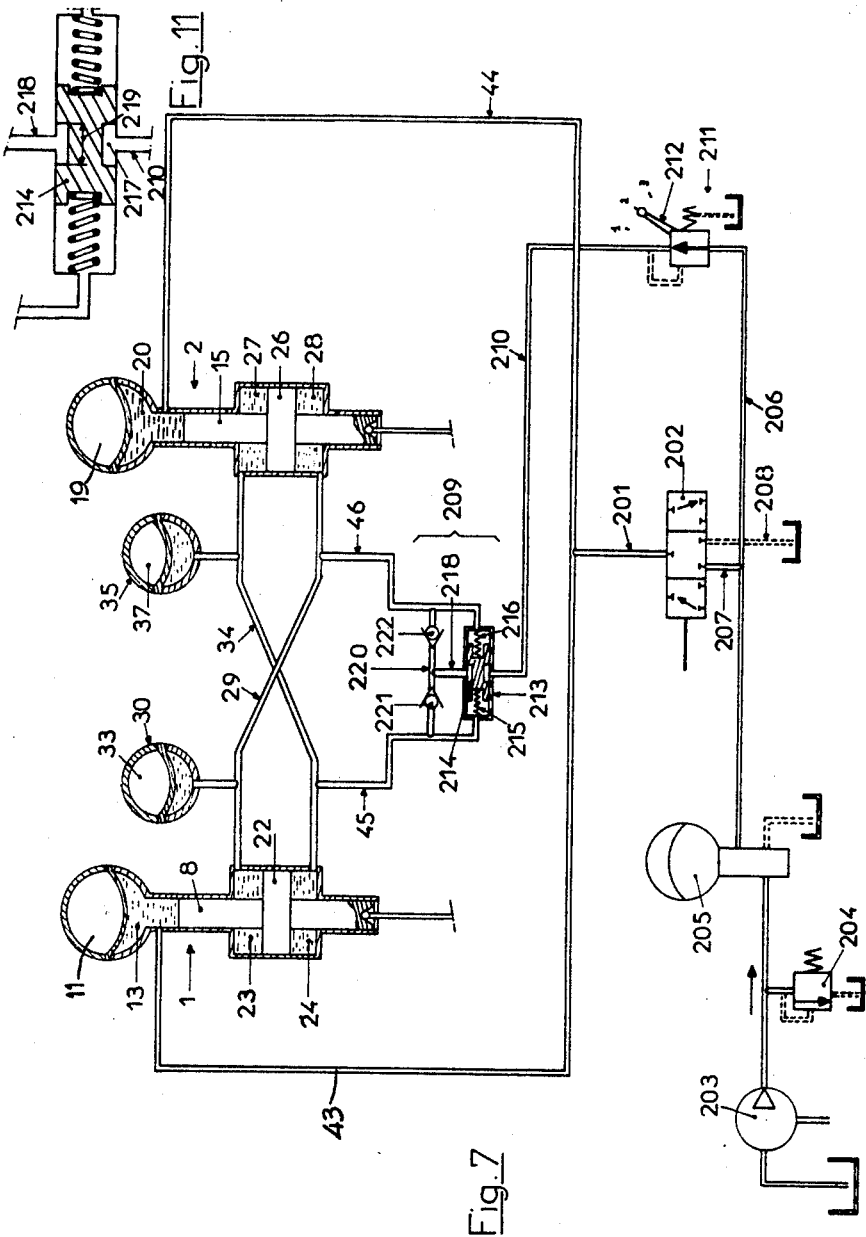

It will suffice to recall that at each end of an axle, carrying two road wheels of the vehicle, there is provided a hydro-pneumatic element or jack 1 and 2 whose triple-acting differential piston 8, 22 or 15, 26 slides in a fixed cylinder which forms three independent oil chambers 13, 23, 24 or 20, 27, 28 (FIG. 7).

The annular chambers 23 and 28 intercommunicate via a pipe 29 to which is connected a hydraulic pressure accumulator 30 provided with a gas cushion 33. Similarly, the annular chambers 24 and 27 are interconnected by a pipe 34 communicating with a hydraulic pressure accumulator 35 enclosing a gas cushion 37. These two pipes 29 and 34 are crossed and are each fed through a branch pipe designated 46 for the pipe 29 and 45 for the pipe 34.

The main oil chambers 13 and 20 are fed respectively by pipes 43 and 44 and communicate with main pressure accumulators including gas cushions 11 and 19.

One of the most important features of the present invention resides in separately feeding, on the one hand, the oil chambers 13 and 20 of the main suspension (pipes 43 and 44 connected to a common feed pipe 201) and, on the other hand, the pipes 45 and 46 of the oil chambers 23, 24, 27 and 28 of the roll-correction mechanism.

For this purpose the main feed pipe 201 is connected by a hydraulic distributor 202, of conventional type, directly to the pressure generator with which the vehicle is equipped. This pressure generator comprises in the usual way a pump 203, provided at its outlet with a throttle valve 204, which inflates a main hydraulic accumulator 205 to produce an almost constant feed pressure in a supply conduit 206. The distributor 202 is connected to a branch 207 of this conduit 206. The distributor 202 has three positions and is designed to:

disconnect the pipes 201 and 207 (the case illustrated in FIG. 7, which corresponds to normal operation while the vehicle is running); or interconnect the pipes 201 and 207 to send oil into the main chambers 13 and 20, for example to compensate for a leak, or to re-establish the ground clearance of the vehicle when its static load has just been increased; or connect the pipe 201 to a return pipe 208 leading to a reservoir, in order to deflate the chambers 13 and 20 of the main suspension when the vehicle has just been unloaded.

It will be apparent that this oil circulation and the operation of the main suspension itself are carried out independently of any roll correction.

The roll-correction mechanism comprises a make-and-break switch indicated generally at 209 which connects the pipes 45 and 46 to a common inlet pipe 210. This latter communicates through a pressure regulator 211 with the supply conduit 206.

The regulator 211 may be a pressure-reduction valve or a pressure amplifier. It has a manual control lever 212 which, in the example illustrated, may occupy three distinct positions, allowing the magnitude of the supply pressure for pipe 210 to be preselected.

Figure 8:
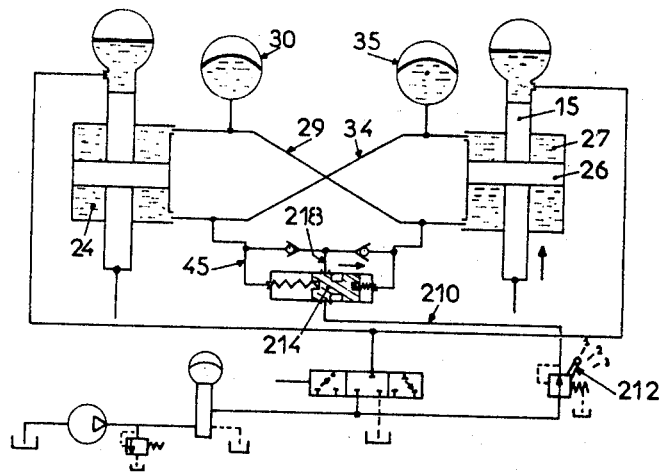
FIGS. 8, 9 and 10 show three different operating positions of the system.

The make-and-break switch 209 comprises a valve housing 213 inside which a slider 210 is bracketed by two opposing biasing springs 215 and 216. The chamber which contains the spring 216 is connected to the pipe 46. Similarly, the pipe 45 opens into the chamber containing the spring 215. In its central portion, the slider 214 is formed with a peripheral constriction 217 (FIG. 11) normally bridging two confronting ports so as to connect the pipe 210 to an extension 218 thereof. A major shift of the slider 214 to the left (FIG. 8) or to the right interrupts all communication between the two pipes 210 and 218. However, the width 219 of the constriction 217 is sufficient to allow a slight movement of the slider 214 in one direction or the other without interrupting communication. It will be seen later that this is useful in avoiding a reaction of the device to minor variations in the vehicle load.

The pipe 218 opens into a transverse pipe 220, between two check valves 221 and 222 effective in opposite directions of flow. Beyond the valve 221 the pipe 220 is connected to the pipe 45. Similarly, beyond the valve 222 the pipe 220 opens into pipe 46. Thus the fluid coming from the pipe 218 may flow into one or the other of the two pipes 45 or 46, but the reverse flow is impossible.

Figure 2:
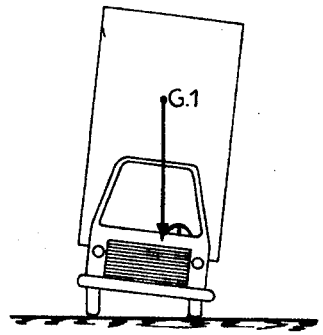

The operation is as follows:

When the vehicle carries a load which is heavy but of low density (FIGS. 1 and 2), the overall center of gravity $G_1$ is situated very high above the ground. In consequence, in a curve (FIG. 2), the vehicle has a tendency to sway and the corrective action must be strong, with considerable rigidity. For this purpose it is sufficient to bring the lever 212 to a position 1 (FIG. 8) which selects a high level for the pressure present in the pipes 29 and 34. This results in the inflation of the accumulators 30 and 35 under heavy pressure, for example to 140 bar.

As soon as the truck begins to sway, for example in a curve (FIGS. 2 and 8), the suspension elements are compressed on one side. Let us assume, for example, that the right jack 2 is the one whose piston rises slightly. As a result, the pressure increases in the chambers 27 and 24 as well as in the pipe 45. This causes the displacement of the slider 214 to the right (FIG. 8) and the interruption of the communication between the pipes 210 and 218. In consequence, the pipes 29 and 34 are totally isolated from each other and the correction of roll is carried out the manner described in my U.S. Pat. No. 3,606,374 referred to above.

When the vehicle returns to the vertical (FIG. 1), the slider 214 returns to its central position (FIG. 7) which allows fluid to flow from the pipe 210 through one or other of the check valves 221 and 222 to compensate, if necessary, for leaks in the system.

Figure 3:
Figure 4:
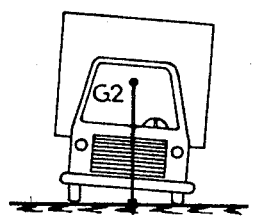
Figure 9:
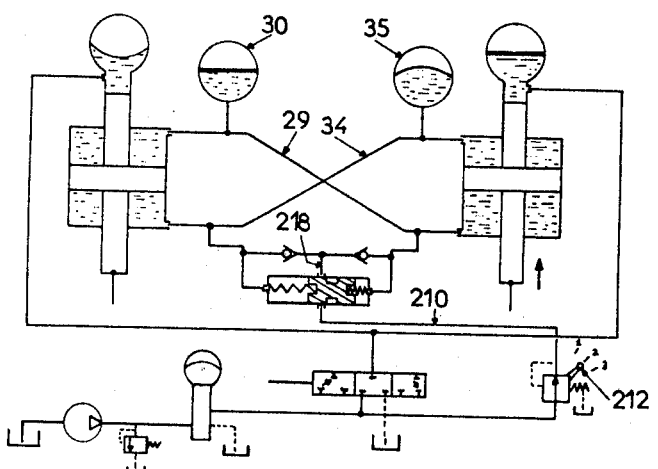

If, on the other hand, the vehicle carries a load of greater density but of the same rolling weight, the overall center of gravity $G_2$ is lower than previously (FIGS. 3 and 4). It therefore becomes useful to reduce the rigidity of the roll-correction mechanism. For this purpose the operator places the lever 212 in the position 2 (FIGS. 7 and 9). In this case, when the vehicle is in the normal position (FIGS. 3 and 7), the slider 214 allows the pipe 210 to feed the pipes 29 and 34 with fluid at medium pressure (for example, at 100 bar). This results in the inflation of the accumulators 30 and 35 to that pressure.

As soon as the vehicle tilts in a curve (FIGS. 4 and 9), the slider 214 moves and again interrupts the communication between the pipes 210 and 218. In consequence, the crossed pipes 29 and 34 are isolated from each other and roll correction is carried out as described above but with reduced pressure.

Figure 5:
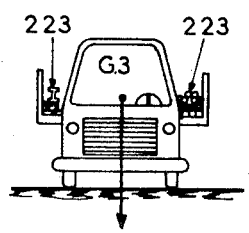
Figure 6:
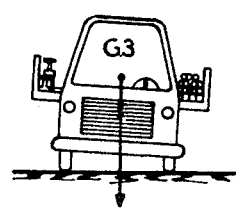
Figure 10:
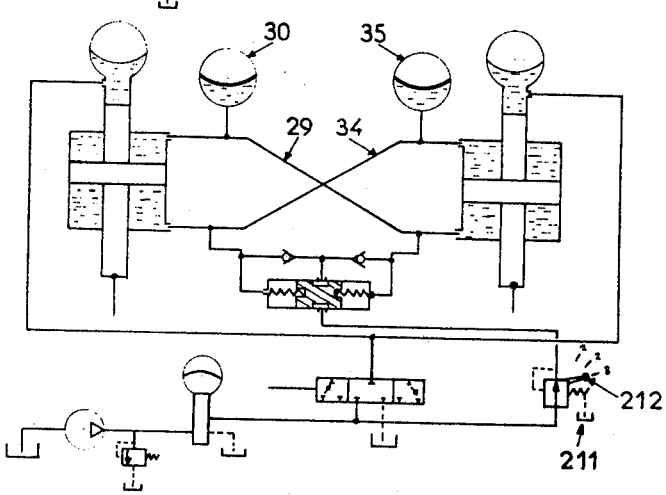

Finally, if the vehicle is loaded with very dense materials, for example with iron objects 223 (FIGS. 5 and 6), the overall center of gravity $G_3$ is very low for the same total rolling weight. Under these conditions, the roll correction must be carried out with a minimum stiffness. For this purpose the driver puts the lever 212 in the No. 3 position (FIG. 10) for which the pressure selector 211 supplies a minimum pressure, for example equal to 60 bar. Here again, when the vehicle tilts driving through a curve (FIG. 6), the slider 214 moves and interrupts the communication between the pipes 29 and 34. The roll correction is carried out in the same manner as before but under low pressure.

Since the constriction 217 of the slider 214 (FIG. 11) has an effective width 219 substantially greater than that of the adjoining inlet and outlet ports, the slider 214 may make slight movements, corresponding for example to the loading or unloading of a single one of the iron objects 223 (FIGS. 5 and 6), without immediately causing a response of the roll-correction system.

I claim:

1. In a hydropneumatic suspension system for a motor vehicle including a pair of laterally spaced hydraulic jacks each comprising a cylinder with a main chamber, an upper ancillary chamber and a lower ancillary chamber, a piston under differential pressure from said ancillary chambers, a pair of crossed conduits connecting the upper ancillary chamber of each jack to the lower ancillary chamber of the other jack, a pair of pressure accumulators respectively communicating with said crossed conduits and feed means for supplying hydraulic fluid under pressure to said chambers, the improvement wherein said feed means comprises a first supply channel communicating with the main chambers of said jacks, a second supply channel separately communicating with said crossed conduits, and valve means in said second supply channel responsive to a significant pressure differential between said crossed conduits for disconnecting the latter from their source of hydraulic fluid.

2. The improvement defined in claim 1, further comprising a distributor in said first supply channel responsive to changes in the static load of the vehicle.

3. The improvement defined in claim 1 wherein each of said jacks is provided with a gas cushion communicating with the main chamber thereof.

4. The improvement defined in claim 1, further comprising an adjustable pressure selector in said second supply channel upstream of said valve means.

5. The improvement defined in claim 4 wherein said valve means comprises a slide valve with a housing having an inlet port and an outlet port, a slider in said housing bridging said ports in a central position thereof, and biasing means urging said slider into said central position, said housing being connected at opposite ends to said crossed conduits.

6. The improvement defined in claim 5 wherein said crossed conduits have respective branches leading to said outlet port, further comprising a pair of check valves in said branches blocking a return flow from either branch to the other branch and to said outlet port.

7. The improvement defined in claim 5 wherein said passage has an effective width substantially greater than that of said ports for maintaining a connection therebetween upon minor shifts of said slider from said central position.

8. The improvement defined in claim 5 wherein said passage is formed by a peripheral constriction of said slider.

* * * * *